D. CAVICCHIOLI.
CUSPIDOR.
APPLICATION FILED MAY 15, 1912.
1,034,080.
Patented July 30, 1912.
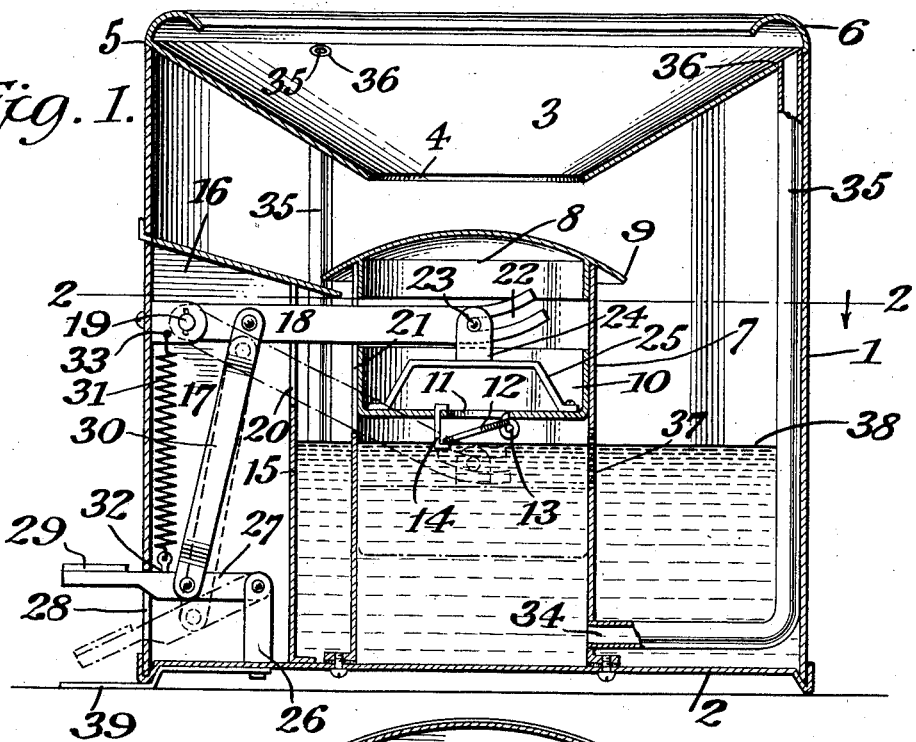
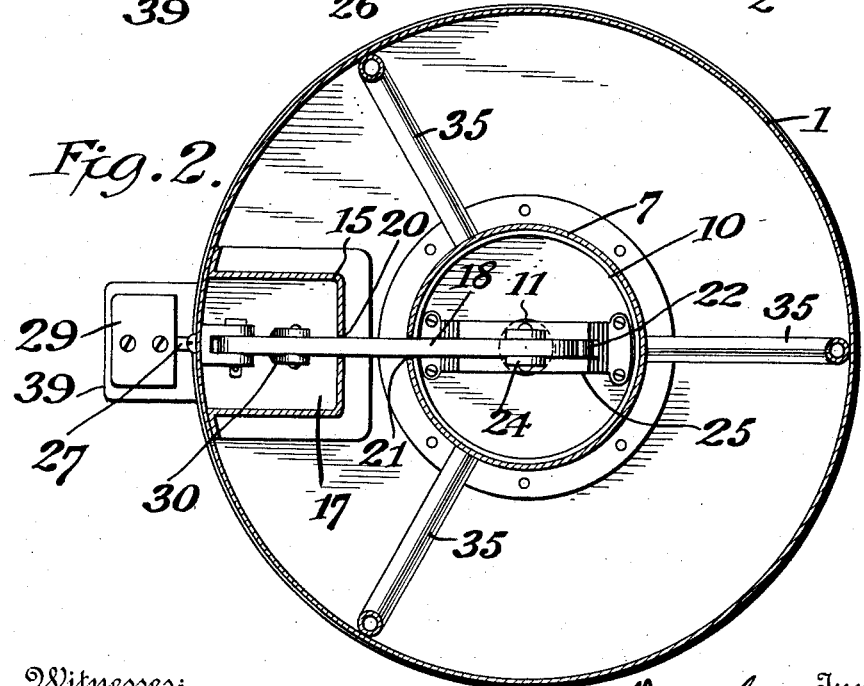
Witnesses:
A. R. Appleman
S. Weinreich
Inventor.
Dante Cavicchioli
By his Attorneys Edgar Tate & Co.

UNITED STATES PATENT OFFICE.

DANTE CAVICCHIOLI, OF NEW YORK, N. Y.

CUSPIDOR.

1,034,080.　　　　　Specification of Letters Patent.　　Patented July 30, 1912.

Application filed May 15, 1912. Serial No. 697,364.

*To all whom it may concern:*

Be it known that I, DANTE CAVICCHIOLI, a citizen of the United States, and residing at Manhattan, in the county of New York and State of New York, have invented certain new and useful Improvements in Cuspidors, of which the following is a specification, such as will enable those skilled in the art to which it appertains to make and use the same.

The object of this invention is to provide a cuspidor having the usual depressed top provided with a central opening and with means for washing said top and to keep the same clean, and whereby said cuspidor may be made to present a cleanly appearance at all times, and with this and other objects in view the invention consists in a device of the class specified constructed as hereinafter described and claimed.

The invention is fully disclosed in the following specification of which the accompanying drawing forms a part, in which the separate parts of my invention are designated by suitable reference characters in each of the views, and in which:—

Figure 1 is a sectional side elevation of my improved cuspidor, and:—Fig. 2 a transverse section on the line 2—2 of Fig. 1.

In the practice of my invention I provide a casing 1 having a bottom 2, and said casing is preferably circular in form, and the bottom 2 is preferably raised and said casing is also provided with a removable top or cover 3 made in the form of an inverted cone and provided with a central opening 4, and the rim of said top which rests on the casing 1, as shown at 5 is provided with a raised and inwardly curved flange 6.

Placed centrally within the casing 1 and secured to the bottom 2 is a supplemental casing 7 the transverse dimensions of which are about one-third of the transverse dimensions of the casing 1, and the height of which is a little more than half the height of said casing 1, and said supplemental casing is provided with a removable convex cap 8 having a projecting flange or rim 9.

Placed in the supplemental casing 7 is a vertically movable box-shaped plunger 10 the bottom of which is provided with a central port or passage 11 adapted to be closed by a valve 12 hinged to said bottom at 13, and the bottom of the flange is also provided with a hanger 14 which limits the downward movement of said valve.

Within one side of the casing 1 is another casing 15 which is preferably angular in cross section and which is provided with a downwardly inclined cover 16, and within the chamber 17 formed by the casing 15 is placed the means for operating the plunger 10 which consists of an arm 18 pivoted at 19 and extending through slots 20 and 21 in the adjacent walls of the casings 15 and 7, and the inner end of which is provided with a slot 22 through which passes a pin 23 connected with ears 24 formed on or connected with a yoke-shaped device 25 secured to the plunger 10.

In the bottom of the chamber 17 is a raised support 26 to which is pivoted a pedal lever 27 which passes out through a slot 28 in the wall of the casing 1 and is provided with a foot piece 29, and connected with the pedal lever 27 is a link 30 which is also connected with the arm 18 and a spiral spring 31 is connected with the pedal lever 27 at 32 and with the support of the arm 18 at 33. The spring 31 normally holds the arm 18, the plunger 10, and the parts connected with the arm 18, in the position shown in full lines in Fig. 1, but said parts may be depressed, as shown in dotted lines in said figure, by pressure applied to the foot piece 29 of the pedal lever 27.

Connected with the bottom portion of the supplemental casing 7, as shown at 34, are pipes 35 which extend outwardly, radially to the wall of the casing 1 and thence up to the top thereof, and said top is provided with apertures or openings 36 to receive the ends of said pipes, and the wall of the casing 7 is also perforated about midway of the height thereof, as shown at 37.

In the use of this device water is poured into the casing through the top 3 thereof and this water flows down into the bottom of said casing, and enough of this water is used to fill said casing approximately to the point indicated at 38, and if cigar stubs or other refuse matter or substances are thrown into the cuspidor they too will fall down into the bottom of the casing 1 and into the water 38, and spittle or other products of expectoration after falling onto the top 3 will also flow down into the water 38, and if at any time it is desired to clean the top 3 the pedal lever 27 is depressed by means of the foot or otherwise, and this operation depresses the arm 18 and forces the plunger 10 downwardly and the water in the supplemental casing 7 which flows thereinto through the perforations 37 is forced out through the pipes 35 and is discharged onto the top of the cover 3 from which it flows back into the casing 1 and this operation, as will be understood, will thoroughly clean the top 3.

The object of the port or passage 11 in the bottom of the plunger 10 is to permit any liquids that may gather in said plunger to flow back into the bottom of the casing 7 when said plunger is raised, this last operation being performed by the spring 32, and when said plunger is depressed, as hereinbefore described, the valve 12 closes the port or passage 11.

When it is desired to empty the main casing 1 of its contents the top or cover 3 is removed and said casing may be emptied and cleaned in the usual manner, and if it is desired at any time to clean the inner casing 7 the cap 8 thereof may also be removed.

The flange 6 of the top or cover 3 prevents the water propelled through the pipes 35 from being thrown out and scattered and compels the said water to flow down over the top or cover 3, as hereinbefore described.

The bottom of the casing 1 is provided beneath the pedal lever 27 with a projecting foot piece 39 which prevents the tilting of the cuspidor when pressure is applied to said lever, but my invention is not limited to the means, herein shown and described, for operating the arm 18, or depressing said arm, and any suitable means may be provided for this purpose.

It will be observed that the casing 7 is directly under the central opening in the top or cover 3, and when looking into the cuspidor nothing can be seen except the cap 8 of the supplemental casing 7, and when the top or cover 3 is washed by the water propelled through the pipes 35, as hereinbefore described, the said water also flows down onto the cap 8 and cleans said cap and the cuspidor may thus be made to present a clean appearance at all times.

My invention is also not limited to the form of the separate parts or casings thereof, nor to other details of construction herein shown and described, and various changes therein and modifications thereof may be made, within the scope of the appended claims, without departing from the spirit of my invention or sacrificing its advantages.

Having fully described my invention what I claim as new and desire to secure by Letters Patent, is:—

1. A cuspidor comprising a main outer casing having a removable depressed cover provided with a central opening, a supplemental central inner casing having a removable cap, and the side walls of which are perforated, pipes connected with the bottom of the supplemental inner casing and extending upwardly to the top of the main outer casing and passing through apertures in the rim portion of the cover thereof, a plunger mounted in the supplemental inner casing, and means for operating said plunger.

2. In a cuspidor, a main outer casing having a removable conical inverted cover provided with a central opening and the rim of which is provided with an inwardly curved flange, a supplemental central inner casing provided with a cap, and the side walls of which are perforated, pipes connected with the bottom portion of said inner casing and extending to the top portion of the main outer casing and through apertures in the cover, a plunger mounted in the inner casing, and means for operating said plunger.

3. In a cuspidor, a main outer casing having a removable conical inverted cover provided with a central opening and the rim of which is provided with an inwardly curved flange, a supplemental central inner casing provided with a cap, and the side walls of which are perforated pipes connected with the bottom portion of said inner casing and extending to the top portion of the main outer casing and through apertures in the cover, a plunger mounted in the inner casing, and means for operating said plunger comprising an arm pivoted in one side portion of the main outer casing and in operative connection with said plunger, and means for operating said arm.

In testimony that I claim the foregoing as my invention I have signed my name in presence of the subscribing witnesses this 14th day of May 1912.

DANTE CAVICCHIOLI.

Witnesses:
C. MULREANY,
S. ANDREWS.